United States Patent [19]
Davis, Jr.

[11] 3,943,958
[45] Mar. 16, 1976

[54] CONTINUOUS AIR REMOVAL VALVE

[76] Inventor: Roy Forrest Davis, Jr., 3946 Lay, East View Apts., Des Moines, Iowa 50317

[22] Filed: Oct. 4, 1974

[21] Appl. No.: 512,260

[52] U.S. Cl. .................. 137/217; 417/306; 417/435
[51] Int. Cl.² ........................................ F16K 24/00
[58] Field of Search ............ 137/215, 217; 417/306, 417/435

[56] References Cited
UNITED STATES PATENTS
2,646,059   7/1953   Wittner et al.................... 137/217 X

*Primary Examiner*—Henry T. Klinksiek
*Attorney, Agent, or Firm*—Morton S. Adler

[57] ABSTRACT

A valved cap is provided for the top of a riser pipe connected to a flow line under pressure such as may be found in irrigation systems and is normally closed when the system is in operation. The valve automatically opens when the system is stopped to admit air for preventing a vacuum build up and closes under pressure when the system is started up during which time air in the riser pipe is permitted to escape to avoid a pressure build up while the valve is closing. An apertured fitting connected to the valve stem within the riser pipe connects to a flexible air vent hose extending down the riser pipe and into the main flow line in the direction of the flow and air trapped in the riser pipe after the valve is closed is siphoned through the hose into the main flow line to be expelled into the atmosphere at an outlet in the main line.

6 Claims, 5 Drawing Figures

U.S. Patent    March 16, 1976    3,943,958
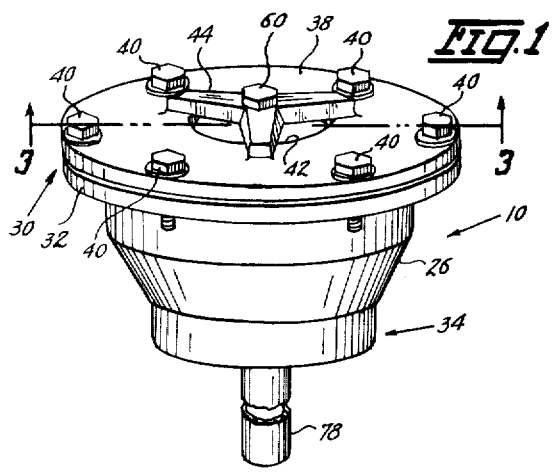
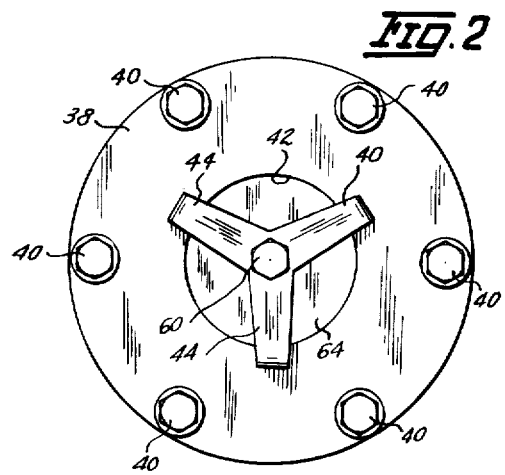
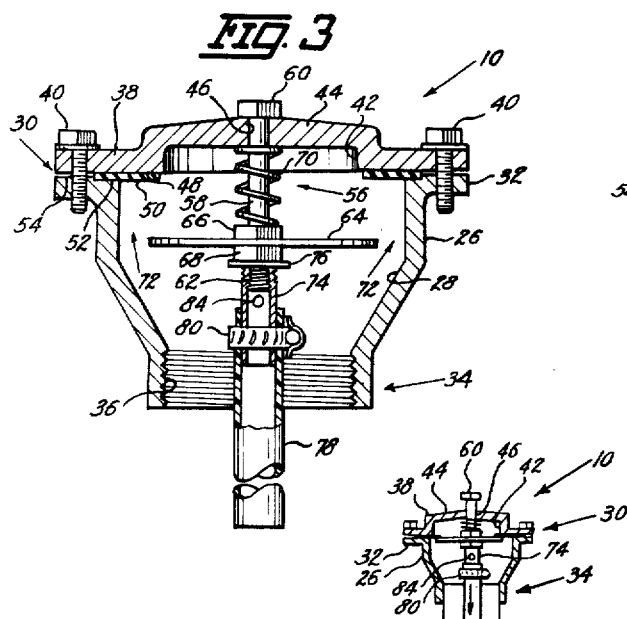
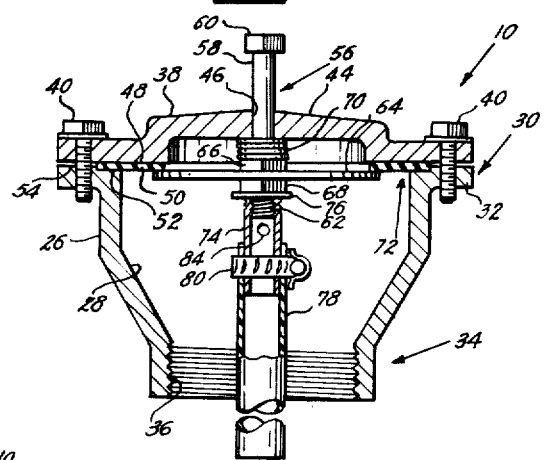
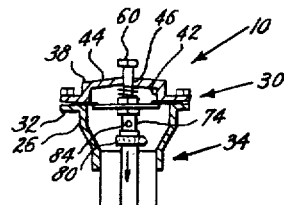
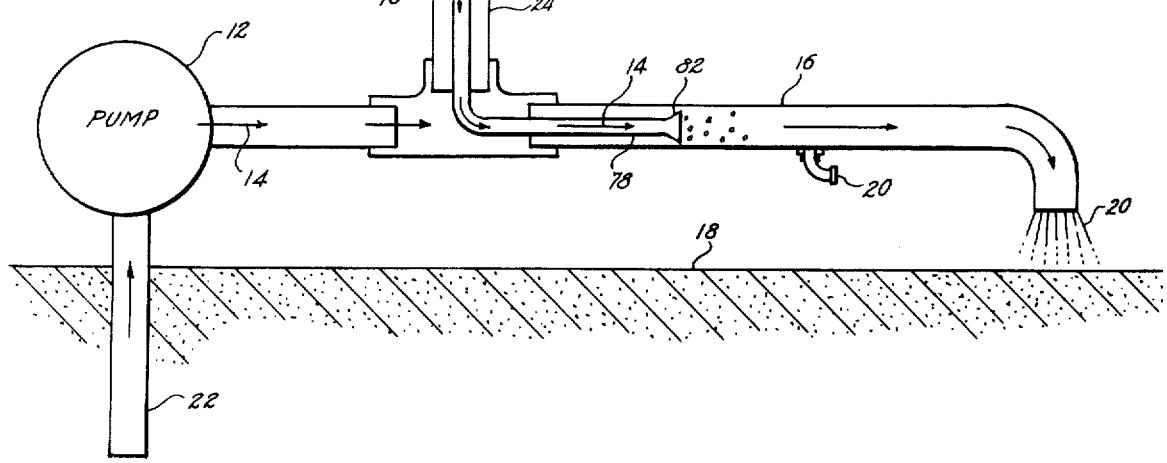

CONTINUOUS AIR REMOVAL VALVE

BACKGROUND OF THE INVENTION

This invention relates to air control valves such as used, for example, in irrigation systems and is an improvement of the vacuum relief valve component disclosed in my U.S. Pat. No. 3,766,941.

In fluid flow lines such as found in irrigations systems, for example, one of the problems encountered relates to the creation of certain vacuum conditions which adversely affect the efficient operation of the entire system when the flow is periodically shut down and restarted. Such systems generally include valved capped riser pipes at selected intervals which, when the system is shut down, open to permit the entrance of air from the atmosphere for preventing a vacuum build up in the riser pipe and which, when the system is started up with the air in the riser pipe being compressed by the rising fluid, closes in response to such air pressure and at the same time with air escaping to the outside while the valve is closing. Such type of a valved cap is disclosed in my patent identified above.

It has now been determined from experiments and experience that upon the starting up of the system, the cap valve frequently reaches its closed position prior to the time all of the air in the riser pipe is expelled so that the trapped air, together with additional air being added by operation of the pump, generates pressures with resulting well known hammering and pounding effects that can and do seriously damage the system.

Accordingly, with the above observations in mind, it is one of the important objects of this invention to provide an improved air removal valve structure in the riser pipe of a fluid flow system which assures the complete exhaustion of air present in such pipe at the time such system is turned on and normally closes the valve in such pipe.

Another object herein is to provide an air valve of the above class which has primary valve means to the outside atmosphere when the system is shut down which closes when the system is started up and which includes auxiliary air removal means by which air that may still be trapped in the riser pipe after the valve is closed in its normal manner, is provided with a novel alternate escape path to the outside atmosphere.

More particularly it is an object herein to provide an air removal valve as characterized which includes an elongated flexible air vent hose or conduit in communication at one end with the upper section of the riser pipe and extending into the main flow line in the direction of flow whereby in the operation of the system, a suction is created in the air conduit to exhaust air in the riser pipe into the main fluid flow for expulsion at a main line outlet.

The foregoing objects and such further objects as may appear herein, or be hereinafter pointed out, together with the advantages of this invention will be more fully discussed and developed in the more detailed description of the accompanying drawings.

BRIEF DESCRIPTION OF THE DRAWINGS

FIG. 1 is a perspective view of this new continuous air removal valve,

FIG. 2 is a top plan view thereof,

FIG. 3 is a cross sectional view taken on the line 3—3 of FIG. 1 showing the primary valve means in open position and the relative position of the auxiliary air removal component, FIG. 4 is a cross sectional view similar to FIG. 3 but showing the primary valve means in closed position, and FIG. 5 is a schematic view of portions of a fluid flow system to illustrate the relationship thereto of this invention.

DESCRIPTION OF THE PREFERRED EMBODIMENTS

Referring to the drawings, this new air removal valve is designated generally by the numeral 10 and the environment in which its use is contemplated, being an agricultural irrigation system or the like, is illustrated schematically in FIG. 5 where an appropriate pump 12 delivers a water flow identified by the arrows 14 through a main flow line 16 arranged above ground level 18 and provided with outlet ports 20 for delivery of the water to selected points as is well known. Pump 12 connects to the inlet line 22 that in turn will communicate with a source of water supply (not shown). Upstanding riser pipes such as at 24 are placed at selected intervals in line 16 in communication with the interior thereof and with the outside atmosphere at the top and valve 10 is constructed and mounted to the top of riser 24 as I will now describe in more detail.

A valve housing 26 having a through bore 28 is provided at its upper or top end 30 with the externally radially projecting peripheral flange 32 and at its lower end 34 is internally threaded as at 36 with an appropriate diameter for threadable attachment to the top of a riser pipe 24. A generally flat disc shaped cap 38, complementary in diameter to housing top 30, is removably attached to flange 32 by any suitable means such as the threaded bolts 40. Cap 38 is provided with an axial vacuum breaker or air port opening 42 over which there is arranged the integral spider brace 44 having the through axial vertical opening 46.

The diameter of cap opening 42 is less than that of bore 28 to define the annular shoulder 48 within such bore and a suitable gasket ring 50 in abutment and complementary with the underside of shoulder 48 is held in place by the attachment of cap 38 to flange 32 as seen in FIGS. 3 and 4. For this purpose, the inner top edge portion of flange 32 is slightly stepped downwardly as at 52 to provide a shoulder 54 against which gasket 50 can nest.

A valve assembly 56 arranged in housing 26 comprises an elongated stem or shank 58 provided with a head 60 on its upper end and being externally threaded 62 at its lower end and for which a conventional carriage bolt or the like may be suitably employed. Shank 58 is slidably disposed through hole 46 in spider 44 and a disc-shaped valve plate 64 is secured to shank 58 by upper and lower nuts 66 and 68 with a suitable yielding means such as the helical spring 70 mounted on shank 58 intermediate nut 68 and the underside of spider 44. The diameter of the valve plate 64 is slightly greater than the diameter of opening 42 in cap 38 but less than the diameter of bore 28 so that in the closed position of valve 10 (FIG. 4), plate 64 seats against gasket 50 and in the open position of valve 10 (FIG. 3), such plate moves to a lower position within housing 26 in spaced relationship to the interior housing walls as at 72 as will be later referred to in describing the operation of this invention.

The lower nut 68 securing valve plate 64 to stem 58 is spaced inwardly from the lower end thereof and a short hollow cylindrical fitting 74 is threadably secured at one end to the lower end of stem 58 with a lock washer 76 against nut 68 so as to depend therefrom and terminate within bore 28. A flexible conduit, preferably in the form of hose 78 or the like, is secured to the depending end of fitting 74 as by the hose clamp 80 and such conduit 78 is of sufficient length so that it can be extended downwardly through the riser pipe 24 and into the main pipe 16 in the direction of water flow when the pump 12 is in operation. For this purpose, it is recommended that relative to the height of the riser pipe 24, the length of conduit 78 be such as to provide approximately eighteen inches of conduit length within the main pipe 16 and with the outlet end of the conduit being preferably flared as at 82. On fitting 74 intermediate the bottom of stem 58 and the top of conduit 78 there is provided a transverse passageway 84 whereby conduit 78 is in communication with bore 28 below the valve plate 64 and in closely spaced relationship to such plate. Thus, with valve 10 constructed as described, it operates in the following manner.

OPERATION

The open position of valve assembly 56 is shown in FIG. 3 which occurs when pump 12 is shut down and, there being no fluid under pressure in pipe 24 or line 16, spring 70 acts to depress the valve plate 64 away from gasket 50 and provide an air inlet path from the atmosphere through opening 42 into bore 28 to prevent any vacuum build up. When pump 12 is started up so as to generate pressures in line 16 and pipe 24, water rising in pipe 24 compresses the air within pipe 24 which in turn acts against plate 64 and in due time will force it upwardly into its closed position shown in FIG. 4. During the travel of plate 64 from its open position in FIG. 3 to its closed position in FIG. 4, it can be appreciated that until the closed position is fully reached, an escape path for the trapped air is available through opening 42 in cap 38 and while this is a desirable objective, I have found from observation and experiment that valve plate 64 and other valve structures with a similar purpose frequently reach their fully closed position prior to the escape of all of the air trapped within housing 26. As a result, with continuing pressure created by pump 12 together with additional air being introduced into the system by the operation thereof, there is developed the well known hammering or pounding which can and does seriously effect and damage the system at times.

In the present invention, such undesirable results are completely eliminated for as plate 64 reaches its completely closed position seen in FIG. 4, all air remaining in housing 26 below plate 64 in seeking the line of least resistance will enter conduit 78 through the opening 84 in fitting 74 and travel through such conduit to the downstream side relative to pipe 24 where it passes out of end 82 and is commingled with water being pumped through such pipe and will be exhausted to the atmosphere at one or more of the outlets 20. By directing and extending conduit 78 in the down stream direction of flow in pipe 16, such flow acts on the flared end 82 to produce a venturi effect and to create a suction or siphon action on conduit 78 so that all air in pipe 24 is removed while pump 12 is in operation. Accordingly, in view of the foregoing, it is thought a full understanding of the construction and operation of this invention will be had and the advantages of the same will be appreciated.

I claim:

1. An air removal valve assembly for use in a water distribution system of the class having a main flow line for conducting water under pressure, said main line being provided with an outlet and including an upstanding riser pipe, said valve assembly comprising:
   a valve housing having a top and bottom end and a through bore and adapted at its bottom end for attachment to the top of a riser pipe for communication with the interior thereof,
   a valve cap removably mounted to the top of said housing,
   said valve cap having a through opening of lesser diameter than but in registry with the bore in said housing,
   a spring loaded valve stem having a valve means on one end,
   means axially disposed on said valve cap for supporting said valve stem so that said valve means is disposed within said housing and adapted for yieldable sealing engagement with said through opening,
   an elongated conduit being of a smaller outside size than the inside of the riser pipe and having one end within said housing operatively secured to said valve stem below said valve means,
   said conduit extending from said housing downwardly through the riser pipe so that its other end projects into said main flow line in the direction of water flow for a selected distance, and
   means in said one end of said conduit for providing communication between the interior thereof and the bore in said housing.

2. A valve assembly as defined in claim 1 including said other end of said conduit being flared.

3. A valve assembly as defined in claim 1 including:
   said valve means being normally urged to open position relative to said through opening to vent said housing to the atmosphere in the absence of pressure in the riser pipe defining the inoperative status of the water distribution system,
   said valve means being moved into sealing engagement with said through opening when pressure is present in the riser pipe whereby air in said housing is removed to the atmosphere through said opening during such movement defining the operative status of the water distribution system, and
   any air remaining in said housing below said valve means after said sealing engagement is established during the operative status of the water distribution system being vented through said conduit into the water flow in the main flow line and is removed to the atmosphere through the outlet in said main flow line.

4. A valve assembly as defined in claim 1 including said conduit being a length of flexible hose.

5. A valve assembly as defined in claim 1 including said conduit projecting into the main flow line in the direction of water flow approximately eighteen inches from the point of intersection of the riser pipe and said main flow line.

6. An air removal valve assembly for use in a water distribution system of the class having a main flow line for conducting water under pressure, said main line being provided with an outlet and including an upstanding riser pipe, said valve assembly comprising:

a valve housing having a top and bottom end and a through bore and adapted at its bottom end for attachment to the top of a riser pipe for communication with the interior thereof, an apertured valve cap removably attached to the top of said housing, a movable valve means operably mounted in said housing for movement toward and away from the aperture in said valve cap, said valve means being responsive to pressure generated in the riser pipe to move into closed position relative to said aperture and in the absence of pressure in the riser pipe to move to an open position relative to said aperature, the open position of said valve means affording an escape path for air in the riser pipe through said aperture while said valve means moves from open to closed position, an air flow conduit operatively arranged at one end in flow communication with the interior of said riser pipe, and said air flow conduit extending from said one end downwardly through said riser pipe into the main line in the direction of water flow whereby after said valve means has moved to closed position, air remaining trapped in the riser pipe is provided a second escape path therefrom through said air flow conduit.

* * * * *